Feb. 23, 1926.
E. OLIVER
RIDING PLOW
Filed August 6, 1925
1,574,684
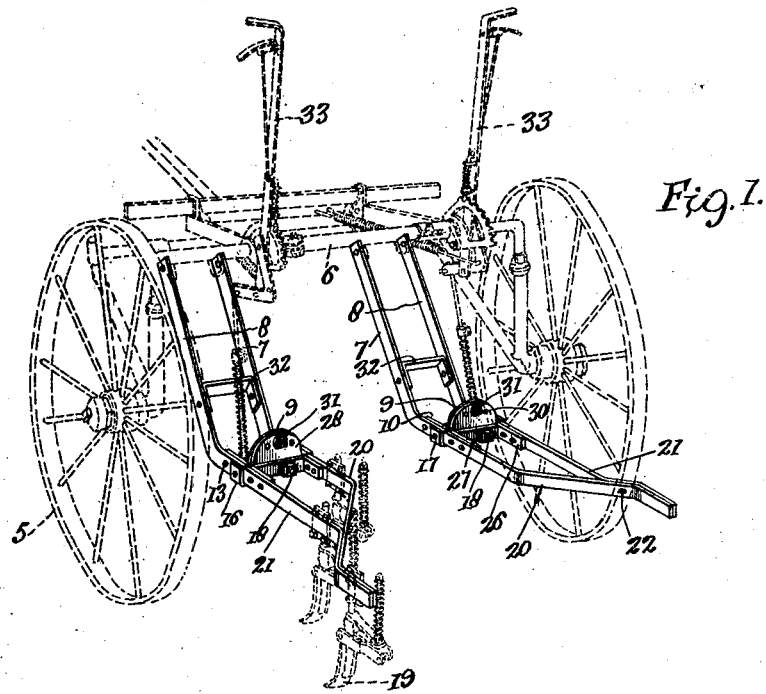
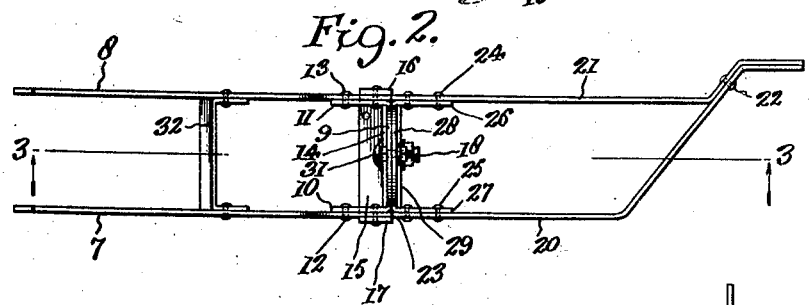
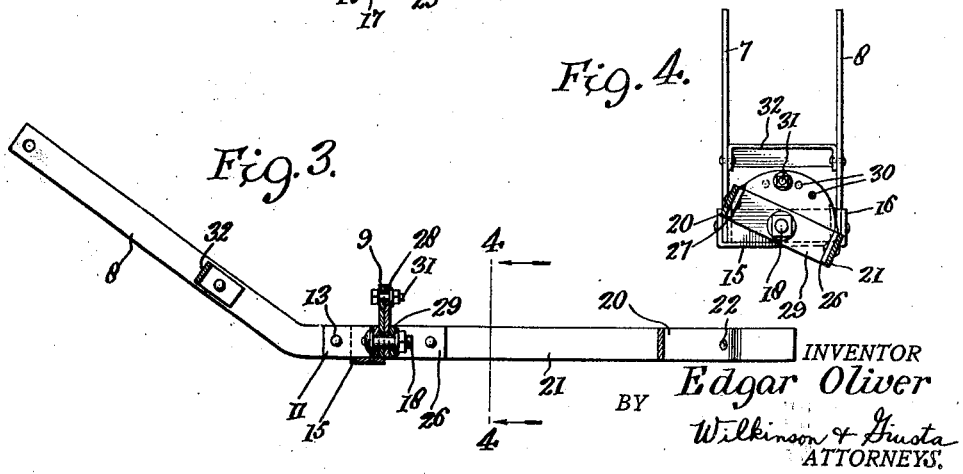
INVENTOR
Edgar Oliver
BY
Wilkinson & Giusta
ATTORNEYS.

Patented Feb. 23, 1926.

1,574,684

UNITED STATES PATENT OFFICE.

EDGAR OLIVER, OF WISNER, LOUISIANA.

RIDING PLOW.

Application filed August 6, 1925. Serial No. 48,634.

*To all whom it may concern:*

Be it known that I, EDGAR OLIVER, a citizen of the United States, residing at Wisner, in the parish of Franklin and State of Louisiana, have invented certain new and useful Improvements in Riding Plows; and I do hereby declare the following to be a full, clear, and exact description of the invention, such as will enable others skilled in the art to which it appertains to make and use the same.

The present invention relates to improvements in riding plows in which provision is made for the tilting of the plow with reference to the vehicle or frame and about a substantially horizontal axis whereby the plow may be able the better to fit the row.

An object of the device is to secure the tilting of the plow with reference to the wheels of the vehicle carrying the plow and in affording a wide range in the tilting movement to enable the device to cope with sharp angles.

A further object of the invention is to provide a strong rigid structure for securing the tilting movement and at the same time sustaining the relatively great strains incident to the plowing.

A further object of the invention lies in providing a structure in which the angular adjustment of the plow may be quickly and conveniently secured and wherein changes in the angular adjustment may be readily had.

With the foregoing and other objects in view, the invention will be more particularly described hereinafter with reference to the accompanying drawings and will be more particularly pointed out in the appended claims.

In the drawings, wherein like reference symbols refer to like parts throughout the several views, Fig. 1 is a perspective view, with parts shown in dotted lines of a riding plow constructed according to the present invention;

Fig. 2 shows on an enlarged scale a plan view of the draft and plow frames between which is incorporated the improved attachment;

Fig. 3 is a longitudinal section taken on the line 3—3 in Fig. 2; and

Fig. 4 is a transverse section taken on the line 4—4 in Fig. 3.

Referring more particularly to the drawings, a riding plow is indicated in dotted lines in Fig. 1, having generally the ground wheels 5 and the arched axle 6. The other parts shown will be known to those skilled in the art and, inasmuch as they do not involve the present invention, no further reference is made to the same.

The arched axle 6 carries one or more draft frames which may be alike in structure. Each of these draft frames is composed of the parallel-spaced bars 7 and 8, the upper ends of which are affixed pivotally to the axle 6, while the lower ends are carried rearwardly and upwardly with respect to the general direction of the bars. The rear ends of the bars are connected together by a U-shaped bearing plate 9, having a portion projecting above the upper edges of the bars and of substantially semi-circular form. The bearing plate 9 is provided with forwardly extending arms 10 and 11 secured, as by the rivets or other fastenings 12 and 13, to the bars 7 and 8. These arms 10 and 11 extend within the bars and parallel therewith and lie in contact with the inner surfaces of the bars for an appreciable length from the rear ends of the bars. It is apparent that the arms might be welded or otherwise secured to the bars. The arms 10 and 11 are maintained in a spread condition against the bars 7 and 8 by the spacing strip 14, which is preferably of substantially the same cross sectional configuration as the bars. The ends of this spacing strip 14 fit snugly against the rearmost portions of the arms 10 and 11, where such arms join the lower portion of the bearing plate 9. The side edges of the bearing plate 9 which engage between the bars 7 and 8, are preferably straight in order that they may lie flush against the bars at this point and maintain contact throughout.

Furthermore, a yoke strip 15 is carried across between the bars beneath the bearing plate 9 and the spacing strip 14, with the ends 16 and 17 of such yoke strip extending upwardly and outwardly of the bars 7 and 8. Such ends 16 and 17 engage in contact throughout the outer surfaces of the bars 7 and 8 and are secured thereto, and also preferably to the arms 10 and 11, by means of the fastenings 12 and 13, by welding or otherwise. The upper surface of the yoke strip 15 is in contact with the lower longitudinal edge of the spacing strip 14 and serves to assist in preventing the rotation of the strip on the pivot bolt 18 which passes centrally through the spacing strip and the bearing plate 9. The engagement of the ends of the spacing strip 14 with the arms 10 and 11 will also serve to prevent any rocking movement of the strip, and the arrangement of the spacing and yoke strips, the arms 10 and 11, bearing plate 9 and bars 7 and 8 form a closely knit strong structure capable of adequately sustaining the strains of the draft, while permitting the plow frame to turn about the pivot bolt 18.

The plows, or other agricultural implements, are indicated at 19, in dotted lines, in Fig. 1. These implements are employed in any appropriate number and they are carried on the plow frame, which consists mainly of the beams 20 and 21, secured together, as indicated at 22, at their rear ends, but having their forward ends spaced apart and extending flush against the adjacent ends of the bars 7 and 8, as represented at 23 in Fig. 2, whereby these ends will engage one another in the normal position of the parts and prevent side play in either the draw or plow frames. The forward ends of the beams 20 and 21 are coupled, as by the rivets or other fastenings 24 and 25, to the arms 26 and 27, which fit flush against the inner surfaces of the beams 20 and 21. These arms might be connected by welding or in any manner desired. The arms carry at their forward ends the second movable bearing plate 28, having substantially the same formation as the fixed bearing plate 9 and engaging in contact therewith.

The spacing strip 29 is placed against the rear surface of the movable bearing plate 28 and about the bolt 18 which passes through both bearing plates and the rear spacing strip 29. This spacing strip 29 engages at its ends against the forward ends of the arms 26 and 27 and prevents inward collapse of the arms or the adjoining ends of the beams 20 and 21. The spacing strip also stiffens the rear plate 28 and keeps it in a straight condition. The bearing plate 28 also has an upper semi-circular portion and series of perforations 30 are made in arcuate groups near the upper rounded edges of the two bearing plates to receive the bolt, cotter pin or other fastening 31, whereby the plates will be maintained in the adjusted position.

In the use of the device, the parts for normal plowing are in the position indicated in Fig. 1, with the plow beams 20 and 21 in substantial alinement with the rear ends of the bars 7 and 8 of the draft frame. This condition is preserved by the fastening 31 engaging through alining perforations 30 of the two bearing plates 9 and 28. For side hill plowing or plowing on uneven ground or under conditions where the wheels 5 will prevent the implements 19 from properly fitting and engaging in the furrows, the plow frame may be tilted about the horizontal axis 18, as indicated in Fig. 4, to bring the plow points to a correct position for properly engaging in the furrow. This adjustment is preceded by the removal of the fastening 31. Subsequent to this adjustment, the fastening is reengaged and serves to hold the parts in the new position until manual restoration or the making of a new adjustment.

At 32 is indicated the usual plates secured between the bars 7 and 8 and at 33 is represented the levers for raising and lowering the plow beams and draft frames.

It will be appreciated from the foregoing that the device, as shown in the drawings, is in the nature of an accessory susceptible of being applied to existing forms of riding plows. The device is applicable to any straight-gang type and, in fact, to any character of plow. The device will yield a relatively great range of angular adjustment and accommodate the plow to any variations encountered in the surface.

I have described a preferred and satisfactory construction of the invention, but it will be apparent that changes and modifications may be made in the constructions, combinations and arrangements of parts and, consequently, I do not wish to be restricted to the single embodiment shown, but reserve the right to make such changes as fall within the scope of the following claims.

What is claimed is:

1. In a riding plow a draft frame composed of spaced bars, a fixed bearing plate secured between the bars, a spacing strip lying against the plate, a plow frame composed of spaced beams, a movable bearing plate connected between said beams and engaging the fixed bearing plate, a spacing and reinforcing strip secured against said movable plate between said beams, a pivot passing through both said plates and bearing strips, and means to hold the plates together.

2. In a riding plow, a draft frame composed of spaced bars, arms secured in contact with the inner faces of said bars, a fixed bearing plate secured to the arms between said bars, a spacing strip lying against the plate with its ends engaging between said arms, a yoke strip engaging the bottom edge of said plate and the bottom edge of said spacing strip and having ends embracing the outer faces of said bars a plow frame composed of spaced beams, arms in contact with the inner surfaces of the beams and secured thereto, a rotary bearing plate secured between said last named arms and arranged in contact with said fixed bearing plate, a spacing strip lying against said movable bearing plate and between said second mentioned arms, a pivot extending through said bearing plates and through said spacing strips, said bearing plates projecting up above said frames and having arcuate groups of perforations therein, and removable fastening means adapted to pass through the selected registering perforations.

EDGAR OLIVER.